(12) United States Patent
Djahanshahi et al.

(10) Patent No.: US 8,223,802 B2
(45) Date of Patent: Jul. 17, 2012

(54) PRIMARY USER DETECTION

(75) Inventors: Amir Hadi Djahanshahi, San Jose, CA (US); Ravi Narasimhan, Los Altos, CA (US); Jim Wood, Fremont, CA (US); Farrokh Farrokhi, San Ramon, CA (US); Sam Heidari, Los Altos Hills, CA (US); Vahbod Pourahmad, Menlo Park, CA (US); Jihoon Yoon, Fremont, CA (US)

(73) Assignee: Quantenna Communications, Inc, Fremont, CA (US)

( * ) Notice: Subject to any disclaimer, the term of this patent is extended or adjusted under 35 U.S.C. 154(b) by 296 days.

(21) Appl. No.: 12/800,309

(22) Filed: May 11, 2010

(65) Prior Publication Data

US 2011/0058535 A1   Mar. 10, 2011

Related U.S. Application Data

(60) Provisional application No. 61/215,996, filed on May 11, 2009.

(51) Int. Cl.
   *H04J 1/02* (2006.01)
(52) U.S. Cl. .......... 370/497; 370/487; 370/490
(58) Field of Classification Search .......... 370/310, 370/343, 488, 487, 490, 497
   See application file for complete search history.

(56) References Cited

U.S. PATENT DOCUMENTS

| 7,548,750 | B2 * | 6/2009 | Kruys et al. | 455/423 |
| 2010/0266002 | A1 * | 10/2010 | Du et al. | 375/224 |

* cited by examiner

*Primary Examiner* — Brenda H Pham

(57) ABSTRACT

A low complexity primary user detection system is disclosed. Signals are filtered to reduce the number of signals that must be processed. Width and PRI of the signals are used to match a constellation associated with a primary user. If the constellation is matched, communication parameters are adjusted to make way for the primary user.

14 Claims, 10 Drawing Sheets

PRIMARY USER DETECTION

CROSS-REFERENCE TO RELATED APPLICATIONS

This application claims priority to U.S. Provisional Patent Application No. 61/215,996, filed May 11, 2009, and which is incorporated by reference.

BACKGROUND

Wireless frequencies are regulated by government agencies. In the U.S., for example, the Federal Communications Commission (FCC), among other duties, is responsible for regulating the use of the wireless spectrum. Increasingly, it has become desirable to make more efficient use of spectrum. Efforts to facilitate maximum utilization of spectrum have resulted in ongoing innovation.

For a spectrum that is allocated for use by a particular user (a primary user) it is possible for another user (a secondary user) to operate within the same spectrum as long as the secondary user does not interfere with the primary user. There are various technical difficulties in accomplishing the goal of enabling secondary users to make use of "unused" bandwidth. Problems include detecting the presence of a primary user before attempting to utilize wireless resources, making way for the primary user if one is detected, and providing other wireless resources if a secondary user has to make way for a primary user. Parameters for accomplishing these goals can vary with the nature of the primary user, regulations, characteristics of a particular channel, and other factors.

SUMMARY

The following is described and illustrated in conjunction with systems, tools, and methods that are meant to be exemplary and illustrative, not limiting in scope. Techniques are described to address one or more of deficiencies in the state of the art.

In the U.S., the FCC has allowed WiFi to use the same bandwidth as radar. Wireless local area networks (WLANs) must comply with regulations that specify that WLANs must avoid frequencies where a nearby radar system, or more generally a primary user, is operating. So a component of a WLAN must be able to primary user signals and apply appropriate procedures when a primary user signal is detected, such as dynamic frequency selection (DFS) and transmit power control (TPC). A primary user detecting WLAN can determine the presence of a nearby primary user. The primary user detecting WLAN may also be able to initiate DFS and optionally TCP upon detection of a primary user.

BRIEF DESCRIPTION OF THE DRAWINGS

Examples of the claimed subject matter are illustrated in the figures.

DETAILED DESCRIPTION

In the following description, several specific details are presented to provide a thorough understanding of examples of the claimed subject matter. One skilled in the relevant art will recognize, however, that one or more of the specific details can be eliminated or combined with other components, etc. In other instances, well-known implementations or operations are not shown or described in detail to avoid obscuring aspects of the claimed subject matter.

Figure 1:
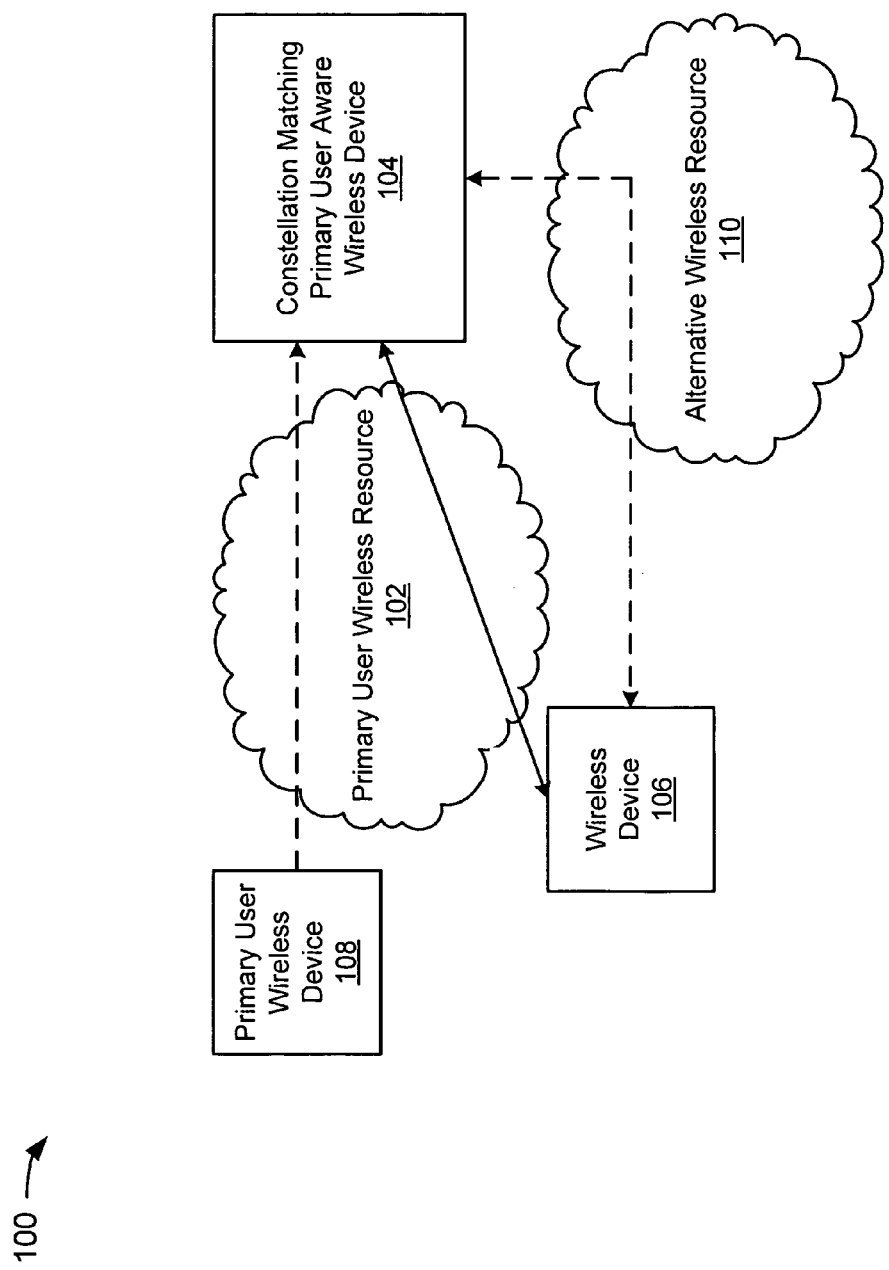
FIG. 1 depicts an example of a system including stations making use of a primary user wireless resource.

FIG. 1 depicts an example of a system 100 including stations making use of a primary user wireless resource. The system 100 includes a primary user wireless resource 102, a constellation matching primary user aware wireless device 104, a wireless device 106, a primary user wireless device 108, and an alternative wireless resource 110.

The primary user wireless resource 102 may include wireless bandwidth that is regulated by an owner or agency (e.g., the FCC) such that secondary users of the wireless bandwidth make way for primary users of the wireless bandwidth. The amount of interference that secondary users may cause, or risk causing, depends upon the regulations, the capabilities of the secondary users in meeting the requirements, and other factors. It is assumed for illustrative simplicity that secondary users attempt to meet the requirements, and make way for primary users in accordance with relevant requirements for using the primary user wireless resource 102.

The constellation matching primary user aware wireless device 104 can be implemented as a station. A station, as used in this paper, may be referred to as a device with a media access control (MAC) address and a physical layer (PHY) interface to a wireless medium that complies with the Institute of Electrical and Electronics Engineers (IEEE) 802.11 standard. In alternative embodiments, a station may comply with a different standard than IEEE 802.11, or no standard at all, may be referred to as something other than a "station," and may have different interfaces to a wireless or other medium. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents.

Frequency variation sensitivity enables the wireless device 104 to implement low complexity primary user signal detection. Although low complexity means that typically precision will be lost when processing signals, reduced complexity can be useful to improve efficiency with adequate precision for filtering signals. The low complexity techniques that enable the wireless device 104 to be a primary user aware device are described later.

The wireless device 106 can be implemented as a station. The wireless device 106 may or may not also be constellation matching and/or primary user aware. However, it is reasonably likely that secondary user requirements may include a requirement that stations that make use of the primary user wireless resource 102 be aware of primary users. That said, in operation, a first station that is communicating with a second station using the primary user wireless resource may be able to detect primary user signals, while the second station is unable to detect the primary user signals due to, e.g., being further from the primary user. So, even if both the first and second stations are primary user aware, both stations will not necessarily be aware of a particular primary user.

In the example of FIG. 1, the primary user wireless device 108 transmits signals through the primary user wireless resource 102, represented by the dashed line from the primary user wireless device 108 to the wireless device 104 through the primary user wireless resource 102. In this example, it is assumed that the signal from the primary user wireless device 108 is not intended for reception by the wireless device 104, but the wireless device 104 can hear the transmission. Since, in this example, the wireless device 104 is associated with a secondary user, the wireless device 104 must make way for the primary user. In order to make way, the wireless device 104 can use the alternative wireless resource 110 to communicate with the wireless device 106, as illustrated by the dashed line from the wireless device 104 to the wireless device 106 through the alternative wireless resource 110.

The way in which the wireless device 106 becomes aware of the need to switch channels could be through a final transmission from the wireless device 104 through the primary user wireless resource 102. A transmission from the wireless device 104 can inform the wireless device 106 of a channel to which to switch if a primary user is detected. Alternatively, the wireless device 106 could have informed the wireless device 104 of the backup channel prior to detection of a primary user signal.

In a specific example, the primary user wireless resource 102 could include spectrum that is allocated to radar signals, and the primary user wireless device 108 is a radar device. The alternative wireless resource 110 could include spectrum that is also allocated to radar signals, or some other spectrum. It may be noted that if the alternative wireless resource 110 includes spectrum that is allocated for use by primary users, the wireless device 104/106 may need to perform certain procedures that include, e.g., scanning to ensure the channel is not currently being used by a primary user.

Figure 2:
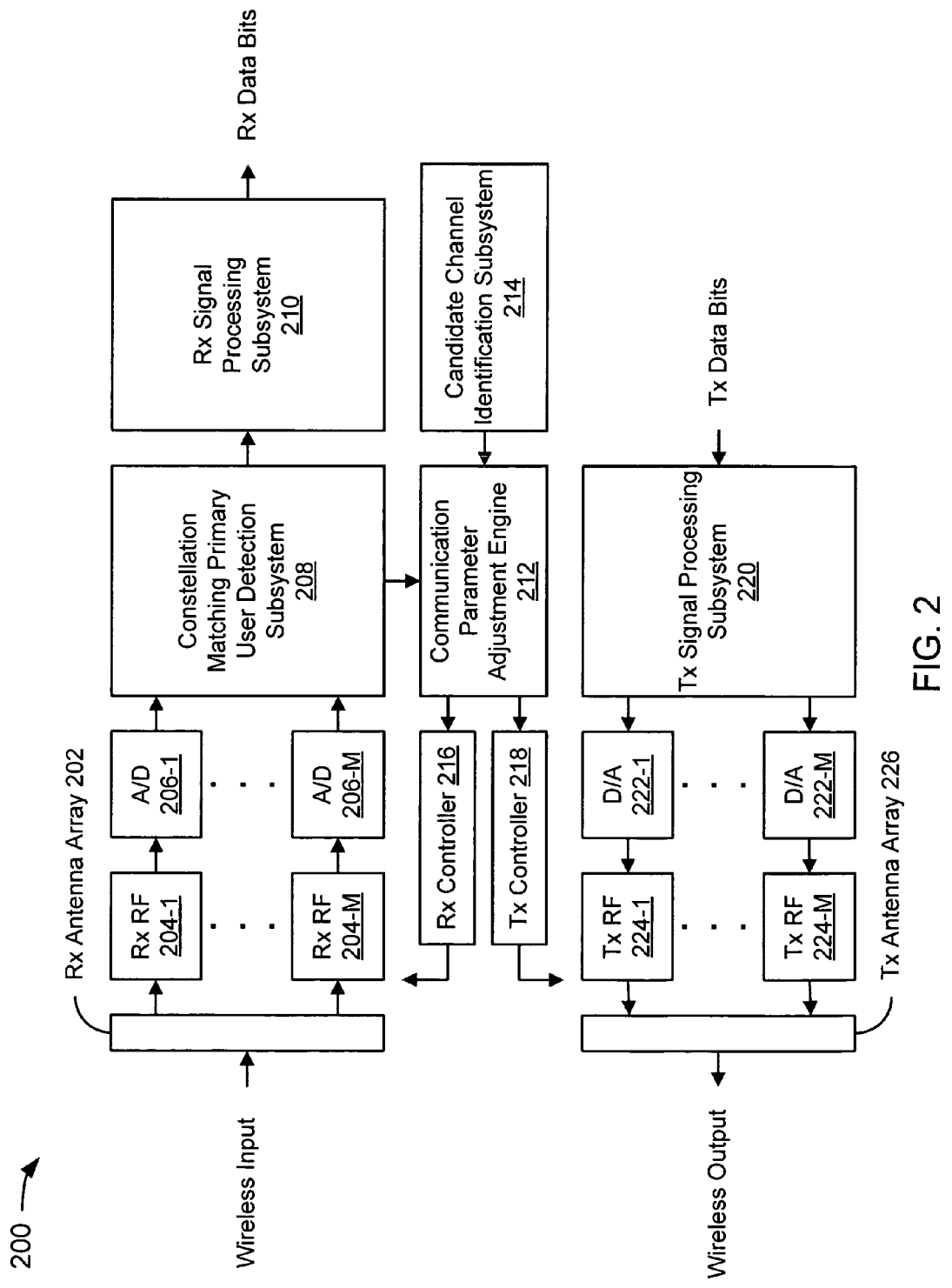
FIG. 2 depicts an example of a constellation matching primary user aware system.

FIG. 2 depicts an example of a constellation matching primary user aware system 200. The system 200 includes a receiver (Rx) antenna array 202, M Rx RF chains 204-1 to 204-M (referred to collectively as the Rx RF chains 204), M analog-to-digital (A/D) converters 206-1 to 206-M (referred to collectively as the A/D converters 206, a constellation matching primary user detection subsystem 208, an Rx signal processing subsystem 210, a communication parameter adjustment engine 212, a candidate channel identification subsystem 214, an Rx controller 216, a transmitter (Tx) controller 218, a Tx signal processing subsystem 220, M D/A converters 222-1 to 222-M (referred to collectively as the D/A converters 222), M Tx RF chains 224-1 to 224-M (referred to collectively as the Tx RF chains 224), and a Tx antenna array 226.

In the example of FIG. 2, wireless input is received by the Rx antenna array 202. Generally as used in this paper, an antenna array includes multiple antennae coupled to a common source or load to produce a directive radiation pattern; the spatial relationship can contribute to the directivity of the antennae. However, a system that is not configured for multiple-input multiple-output (MIMO) operation, other than degenerate cases of MIMO operation, might have a single antenna in the Rx antenna array 202. Multiple-input and single-output (MISO), single-input and multiple-output (SIMO), and single-input and single-output (SISO) systems are degenerate cases of MIMO. A MISO system is a special case of MIMO systems where the receiver has a single antenna. A SIMO system is a special case of MIMO systems where the transmitter has a single antenna. A SISO system is a special case of MIMO system where neither the transmitter nor the receiver have multiple antennas. Techniques described in this paper are generally applicable to MIMO systems and any of the degenerate cases (i.e., MISO, SIMO, and SISO). Thus, the acronym MIMO could be considered to include the degenerate cases, if applicable. The techniques may also be applicable to multi-user MIMO (MU-MIMO), cooperative MIMO (CO-MIMO), MIMO routing, MIMO-OFDM, and other MIMO technologies.

In the example of FIG. 2, the Rx RF chains 204 downconvert to baseband the wireless input received by the Rx antenna array 202. The Rx RF chains 204 can correspond one-for-one to antennas in the Rx antenna array 202. So in an implementation that includes a single antenna in the Rx antenna array 202, there might be a single Rx RF chain. However, this is simply a conceptualization.

In the example of FIG. 2, the analog baseband waveforms are digitized at the A/D converters 206 to produce an $M_r \times 1$ digital received vector y. For illustrative simplicity, for each of two waves that are in quadrature (I and Q), there is conceptually a single A/D converter, though it is recognized that each wave can, and frequently does, have an associated A/D converter. As such, each of the A/D converters 206 can include one or more A/D converter modules.

In the example of FIG. 2, the constellation matching primary user detection subsystem 208 performs functionality that is described later with reference to the example of FIG. 4. An advantage of the subsystem 208 is reducing the computational requirements of the system 200 for a secondary user when the system 200 consumes primary user wireless resources. (Computational requirements increase because secondary users must be able to determine whether received wireless input includes primary user signals, and make way if such signals are detected.)

In the example of FIG. 2, the Rx signal processing subsystem 210 performs functionality that is described later by way of example but not limitation with reference to the example of FIG. 3. Any applicable known or convenient technology could be used to obtain Rx data bits from signals received as wireless input.

In the example of FIG. 2, the communication parameter adjustment engine 212 receives a control signal from the subsystem 208. The control signal can include, for example, a dynamic frequency selection (DFS) command, a transmit power control (TPC) command, and/or some other command that causes the system 200 to change its communication parameters. The control signal can be generated upon reception of a signal that is determined to be from a primary user. Regardless of whether the control signal is because of a primary user signal detection, a false positive, or some other reason, the communication parameter adjustment engine 212 causes the Rx controller 216 and the Tx controller 218 to tune to a desired carrier frequency, adjust power, or take some other action that is an appropriate response for detecting a primary user.

As used in this paper, an engine includes a dedicated or shared processor and, hardware, firmware, or software modules that are executed by the processor. Depending upon implementation-specific or other considerations, functionality of an engine can be centralized or distributed. An engine can include special purpose hardware, firmware, or software embodied in a computer-readable medium for execution by the processor. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 2, the candidate channel identification subsystem 214 can provide channel switching parameters to the communication parameter adjustment engine 212. It is expected that the system 200 is consuming primary user wireless resources within given parameters because it is advantageous (e.g., it enables the system 200 to transmit at higher power than otherwise). So switching to a channel that does not have primary users (or a channel on which the system 200 can operate as a primary user) is presumably less advantageous. Nevertheless, switching to a channel that does not have primary users should be relatively easy, since there is no requirement for the system 200 to verify whether a primary user is utilizing the relevant wireless resources. Therefore, the candidate channel identification subsystem 214 could provide channel switching parameters to the communication parameter adjustment engine 212 sufficient to enable the communication parameter adjustment engine 212 to cause a switch to a candidate channel without substantial preprocessing. In this paper, a candidate channel that does not require any substantial preprocessing to determine whether the channel is available to the system 200 can be referred to as a "safe" channel. For example, a station that is capable of using WiFi might be using resources allocated for radar use, and switch to a "safe" channel that is allocated for WiFi (and/or other) users if a radar signal is detected.

With preprocessing, the candidate channel identification subsystem 214 can potentially enable more optimal choices than switching to a safe channel. The preprocessing can include scanning for open candidate channels, including candidate channels that are allocated for use by a primary user.

The Rx RF chains 204 are part of a circuit that includes the Rx controller 216. The Rx controller 216 is capable of adjusting operational parameters of the Rx antenna array 202, such as by tuning to a desired carrier frequency.

In the example of FIG. 2, the Tx signal processing subsystem 220 performs functionality that is described later by way of example but not limitation with reference to the example of FIG. 3. Any applicable known or convenient technology could be used to obtain $M_t \times 1$ transmit vector x to carry a Tx data bits payload.

In the example of FIG. 2, the transmit vector x is converted to analog waveforms at the D/A converters 222. The number of D/A converters 222 will typically correspond to the number of Tx antennas in the Tx antenna array 226 (or a predictable multiple, such as two), though it is conceivable that a system could have more or fewer D/A converters.

In the example of FIG. 2, the analog waveforms are up-converted to the desired carrier frequency at the Tx RF chains 224. The analog waveforms are provided through the Tx RF chains 224 (the number of Tx RF chains 224 will typically correspond to the number of Tx antennas in the Tx antenna array 226) to the Tx antenna array 226 for transmission as wireless output. The Tx RF chains 224 are part of a circuit that includes the Tx controller 218, which is capable of tuning to a desired carrier frequency, adjusting power, etc.

A MIMO system can be used for spatial multiplexing. In spatial multiplexing, a signal with a high data-rate is split into multiple lower data-rate streams, which are mapped to a Tx antenna array. If these signals arrive at an Rx antenna array with sufficiently different spatial signatures, the receiver can separate the streams, creating parallel channels. Spatial multiplexing can be used to increase channel capacity. Spatial multiplexing can be used with or without transmit channel knowledge.

Spatial multiplexing can be combined with precoding or diversity coding. Precoding, as used in this paper, is used in conjunction with multi-stream transmission of MIMO systems. In precoding, the multiple streams of the signals are emitted from the transmit antennas with independent and appropriate weighting for each antenna such that some performance metric such as the link throughput is maximized. Note that precoding may or may not require knowledge of channel state information (CSI) at the transmitter. Some benefits of precoding include increasing signal gain on one or more streams through diversity combining, reducing delay spread on one or more streams, and providing unequal signal-to-noise ratio (SNR) per stream for different quality of service (QoS).

Beamforming, as used in this paper, is a special case of precoding for a single-stream so that the same signal is emitted from each of the transmit antennas with appropriate weighting such that some performance metric such as the signal power is maximized at the receiver output. Some benefits of beamforming include increasing signal gain through diversity combining and reducing delay spread.

It should be noted that although the system 200 includes distinct Rx and Tx hardware, in an implementation, the Rx antenna array 202 and the Tx antenna array 226 are one in the same, and the arrays are only distinguishable by whether they are currently transmitting or receiving. Other Rx and Tx hardware can be shared, as well, if convenient or desirable.

It should be noted that the components of the system 200 could be distributed across multiple devices. For example, access points (APs) of a wireless local area network (WLAN) might forward all digital signals by wire to a subsystem that analyzes the signals in an effort to, e.g., detect a primary user. Alternatively, a device might have only a receiver and primary user detection subsystem, and send applicable instructions by wire to transmitters.

Figure 3:
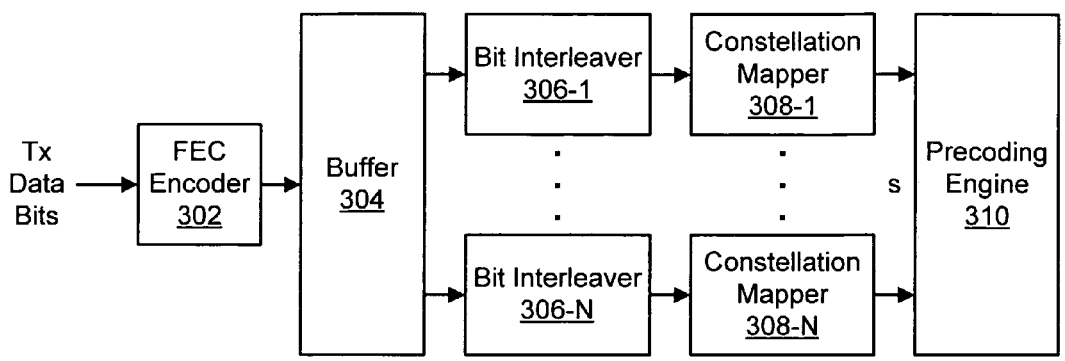
FIG. 3 depicts examples of signal processing subsystems.
Figure 3:
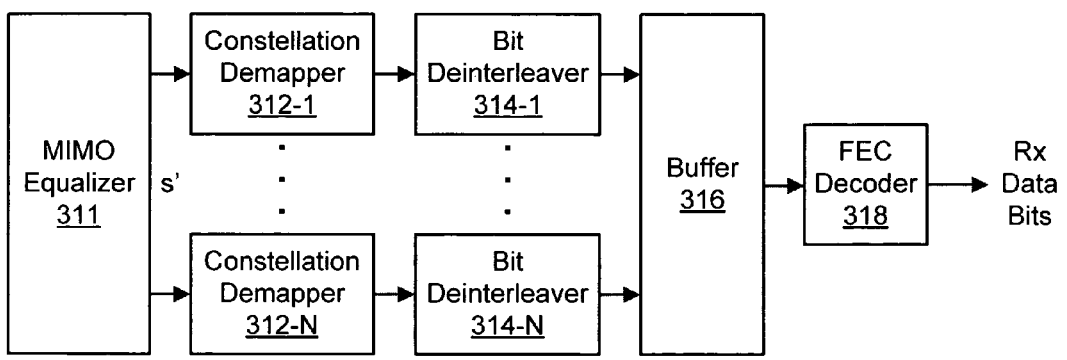

FIG. 3 depicts examples of signal processing subsystems 300A and 300B. The example of FIG. 3 is intended to show examples, not limitations. Persons of skill in the relevant art with this paper before them would understand that certain hardware components are needed to accomplish certain tasks, and different components could be substituted to accomplish the same or related tasks.

The subsystem 300A includes a forward error correction (FEC) encoder 302, a buffer 304, bit interleavers 306-1 to 306-N (referred to collectively as bit interleavers 306), constellation mappers 308-1 to 308-N (referred to collectively as constellation mappers 308), and a precoding engine 310.

In the example of FIG. 3, Tx data bits are encoded at the FEC encoder 302. An FEC encoder is provided in this example because it is a typical device to encode bits in applications such as this. This component, and other components of the example of FIG. 3, could be replaced with alternative components.

In the example of FIG. 3, the coded bits are demultiplexed into $N_s$ independent spatial streams and stored in the buffer 304. A system could be implemented in which the spatial streams are provided without storage in a buffer, or multiple buffers.

In the example of FIG. 3, the spatial streams are bit-interleaved by the bit interleavers 306. The number of bit interleavers typically corresponds to the number of spatial streams, even though a system could have more (perhaps unused) or fewer (though this might be of dubious value based on state of the art techniques) bit interleavers.

In the example of FIG. 3, the interleaved bits are mapped to constellation symbols (such as quadrature amplitude modulation) at the constellation mappers 308. The number of constellation mappers will typically correspond to the number of spatial streams, though it is conceivable that a system could have more (perhaps unused) or fewer constellation mappers. One can use fewer constellation mappers than spatial streams by multiplexing/switching so that one constellation mapper could service multiple streams. This saves space, cost, etc., as would be expected for reusing any piece of hardware. The constellation symbols are collected to form the $N_s \times 1$ constellation vector s.

In the example of FIG. 3, the precoding engine 310 generates an $M_t \times 1$ transmitted vector x. The precoding engine 310 can combine the constellation vector s with an $M_t \times N_s$ precoding matrix Q to obtain x (e.g., x=Qs).

The subsystem 300B includes a MIMO equalizer 311, constellation demappers 312-1 to 312-N (referred to collectively as the constellation demappers 312), bit deinterleavers 314-1 to 314-N (referred to collectively as the bit deinterleavers 314), a buffer 316, and an FEC decoder 318. In the example of FIG. 3, the MIMO equalizer 311 equalizes an Rx vector y' to form an $N_s \times 1$ equalized vector s', the equalized vector s' passes through the constellation demappers 312 and at the bit-deinterleavers 314, the $N_s$ data streams are multiplexed into a single stream and stored in the buffer 316, and Rx data bits are obtained by the FEC decoder 318.

It should be noted that receive chains can be different (e.g., include different components, include more or less of a particular component, etc.). If an external device is sending a signal that is different than that of the device 300's standard receive chain (or one of its standard receive chains), the device 300 may include different or different numbers of components in various receive chains. Some of these components may be "incomplete" in the sense that they may not be able to process a signal from receipt on one or more antennas to deciphering the payload. Thus, the system 200 may or may not use the entire receive chain as illustrated in FIG. 3 in certain cases. However, interference from an external device will have a specific structure, rather than a pseudo-random structure. So the system can use the components of the receive chain to derive information as if the interference were treated as a signal carrying data.

In a band that includes both primary and secondary users, it may be desirable for a secondary user to overhear the primary user, and to use the band under certain constraints. For example; the station associated with a secondary user can be configured to verify which parts of the spectrum are occupied and utilize the free spectrum. A secondary user may not be able to transmit using a primary user protocol. Additionally, the secondary user may or may not be able to process a signal sent using the primary user protocol for the purpose of mitigating interference, improving performance, reducing power consumption, or for other reasons.

Figure 4:
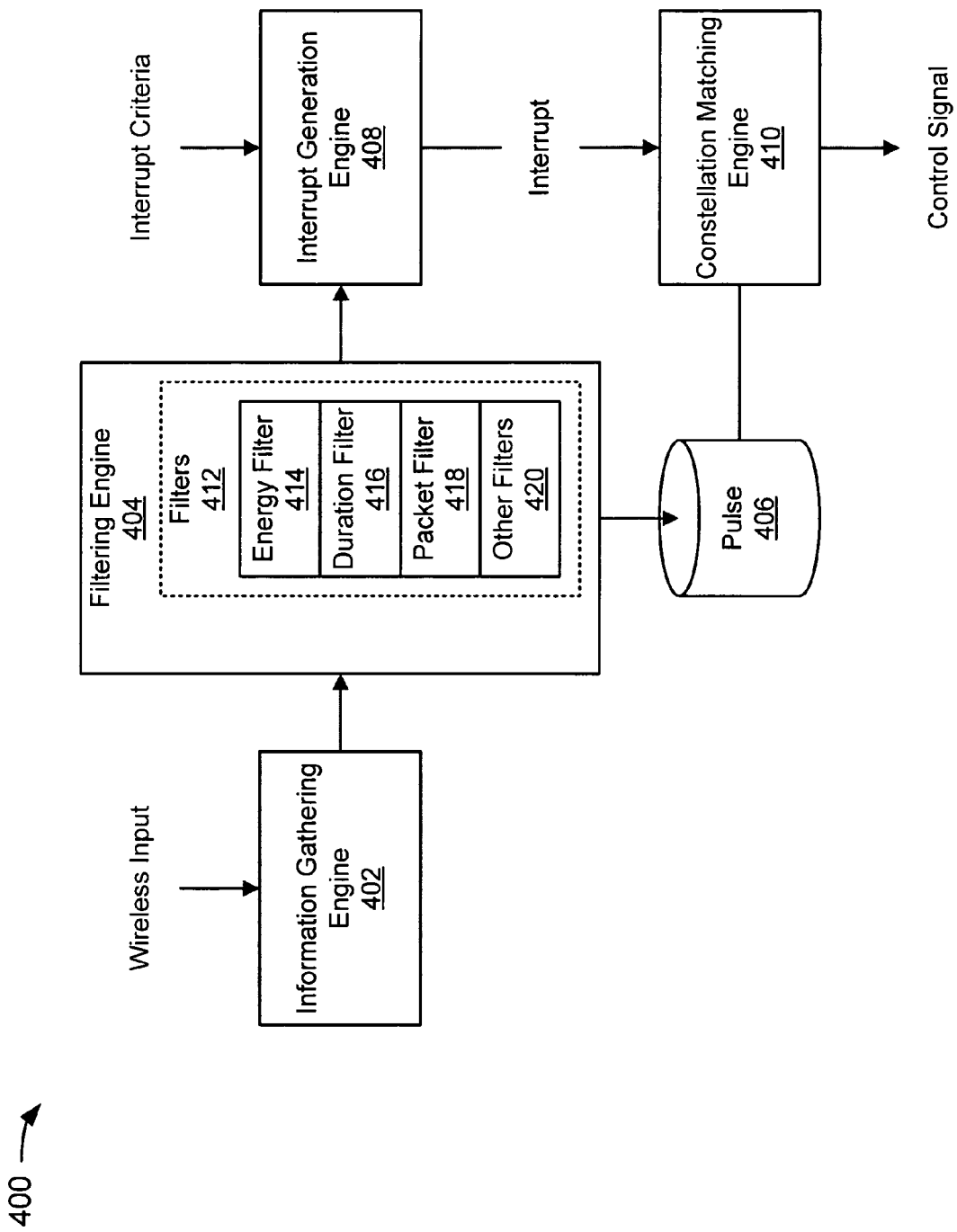
FIG. 4 depicts an example of a constellation matching primary user detection subsystem.

FIG. 4 depicts an example of a constellation matching primary user detection system 400. The system 400 can be implemented as a component of a wireless system (see, e.g., subsystem 208, FIG. 2). Wireless input to the system 400 can include I and Q samples from A/D converters. A control signal from the system 400 can include an instruction to adjust communication parameters (e.g., DFS) if it is determined that a primary user signal has been detected. The system 400 includes an information gathering engine 402, a filtering engine 404, a pulse datastore 406, an interrupt generation engine 408, and a constellation matching engine 410. In a specific implementation, the components 402-408 are implemented in hardware, while the constellation matching engine 410 makes use of software implemented in hardware.

In the example of FIG. 4, the information gathering engine 402 receives wireless input, and signal pulse data is extracted. Rising edge and falling edge data can be extracted, which can be implemented as, for example, timestamps that correspond to a rising or falling edge. For example, the information gathering engine 402 can cycle through a, say, 32 bit timer, saving timestamps when a rising edge or a falling edge is detected. Frequency variation data can include "zero-crossings," which represent the number of times a signal crosses a zero-level in an interval of time. The number does not have to be exactly the same as the number of zero-crossings. For example, a maximum number of zero-crossings could be set such that a zero-crossing value for an interval is the lesser of the number of zero-crossings detected and the maximum number of zero-crossings for an interval. Advantageously, when the gathered information is used to filter, system complexity is relatively low because pulses that need not be matched to primary user constellations are filtered out. Also, the gathered information is sufficient to enable matching to the primary user constellations when pulses are not filtered out.

In the example of FIG. 4, the filtering engine 404, which includes filters 412, filters pulses in accordance with filtering criteria associated with each of the filters 412. The order in which the filters 412 can be used is implementation-specific. The filters 412 are provided as examples, and various implementations may include fewer or more filters than are illustrated in the example of FIG. 4. In the example of FIG. 4, the filters 412 include an energy filter 414, a duration filter 416, a packet filter 418, and other filters 420.

The energy filter 414 can include a cascaded integrator-comb (CIC) filter. In digital signal processing, CIC filters are a class of finite impulse response (FIR) filters used in multirate processing. CIC filters are generally more economical than general FIR filters. For large rate changes, a CIC has a significant advantage over a FIR filter with respect to architectural and computational efficiency.

Figure 5:
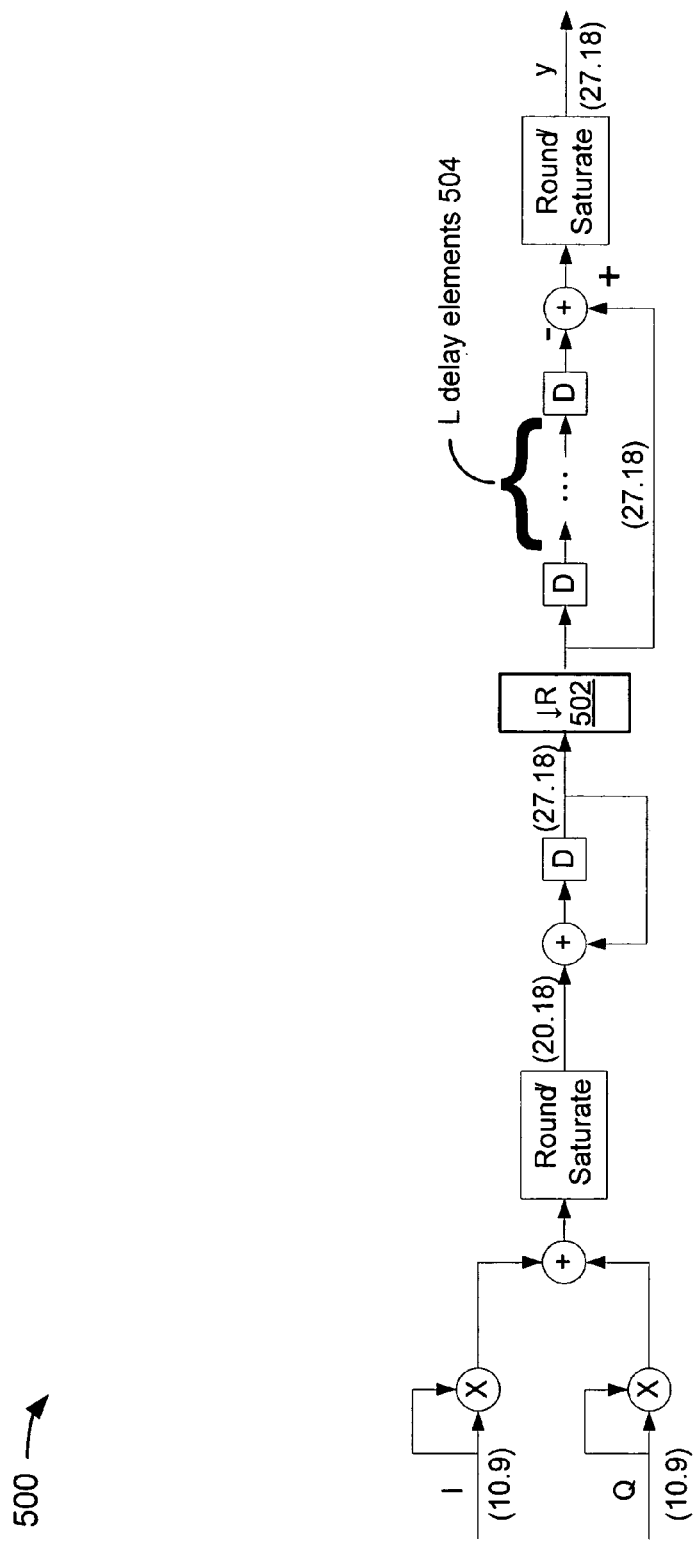
FIG. 5 depicts an example of an energy filtering system.

FIG. 5 depicts an example of an energy filtering system 500 including multipliers ⊗, adders ⊕, delay elements D, a downsampling factor R 502, and L delay elements 504. In the example of FIG. 5, the system 500 has two parameters: (1) the downsampling factor R and (2) the number of delay elements L. The CIC filter output y represents the total energy of (R*L) A/D samples with a resolution (slide interval) of R samples. The integration window is R*L A/D samples. For ND sampling rate of $f_s$=80 MHz, the integration window is (R*L)/80 μs and the resolution is R/80 μs.

For effective filtering, it can be advantageous to know something about the primary user. For example, future regulations specify a minimum radar pulse width of 0.5 μs. For accurate detection of 0.5 μs radar pulses, the integration window should be at most 0.5 μs. So it may be desirable to use the following values of R and L for future radar primary users:

a. R is a programmable integer between 1 and 8 (R=1, 2, . . . , 8)

b. L is a programmable integer between 1 and 10 (L=1, 2, . . . , 10)

The settings (R=8, L=5) and (R=4, L=10) both provide a 0.5 μs integration window with a resolution of 100 ns and 50 ns, respectively.

Referring once again to the example of FIG. 4, the duration filter 416 can include a device to detect the rising and falling edges of a signal. Where the duration filter 416 follows the energy filter 414, detection is of the rising and falling edges of the output (y) of the energy filter 414. If the pulse is not of an appropriate width and/or pulse repetition interval (PRI) for a given primary user, the pulse is filtered out. Table 1: Radar Types lists width and PRI requirements for various radar types. In an implementation where the primary user is a radar user, it may be desirable to make Table 1 programmable and expandable to account for future radar types.

TABLE 1

Radar Types

| Radar Type | Min Pulse Width (us) | Max Pulse Width (us) | Min PRI (us) | Max PRI (us) | Number of Pulses | Notes |
|---|---|---|---|---|---|---|
| FCC 1 | 1 | 1 | 1428 | 1428 | 18 | Ref: FCC 06-96 |
| FCC 2 | 1 | 5 | 150 | 230 | 23-29 | |
| FCC 3 | 6 | 10 | 200 | 500 | 16-18 | |
| FCC 4 | 11 | 20 | 200 | 500 | 12-16 | |
| FCC 5 | 50 | 100 | 1000 | 2000 | 1-3 per burst, 8-20 bursts | Long pulse, staggered PRI |
| FCC 6 | 1 | 1 | 333 | 333 | 9 per hop | Frequency hopping |
| ETSI DFS ref | 1 | 1 | 1428.57 | 1428.57 | 18 | Ref: ETSI EN 301 893 v1.5.1; next version has min. pulse width of 0.5 us |
| ETSI 1 | 0.8 | 5 | 1000 | 5000 | 10 | |
| ETSI 2 | 0.8 | 15 | 625 | 5000 | 15 | |
| ETSI 3 | 0.8 | 15 | 250 | 434.78 | 25 | |
| ETSI 4 | 20 | 30 | 250 | 500 | 20 | |
| ETSI 5 | 0.8 | 2 | 2500 | 3333.33 | 10 | Number of pulses per PRI (total number of PRIs = 2 or 3) |
| ETSI 6 | 0.8 | 2 | 833.33 | 2500 | 15 | Number of pulses per PRI (total number of PRIs = 2 or 3) |
| TELEC 1 | 1 | 1 | 1428.57 | 1428.57 | 18 | Ref: TELEC (Item 19-3 of Article 2 Paragraph 1) |
| TELEC 2 | 2.5 | 2.5 | 3846.15 | 3846.15 | 18 | |

In the example of FIG. 4, the packet filter 418 can be used to filter out pulses that can be identified as valid packets for a secondary user. For example, WiFi packets received on a channel associated with radar primary users can be filtered out as secondary user packets.

In the example of FIG. 4, other packet filters 420 is intended to illustrate that further filters could be used in addition to (or as an alternative to) the filters 414-418 provided as examples.

In the example of FIG. 4, the pulse datastore 406 includes data associated with pulses that were not filtered out by the filtering engine 404. The pulse datastore 406 can be implemented as a data structure (or multiple data structures) stored in memory. By way of example but not limitation, pulse data can be stored as a record in a database, as arrays in a flat file, as a table in volatile memory, or in some other convenient manner.

In the example of FIG. 4, the interrupt generation engine 408 has interrupt criteria that are associated with when the interrupt generation engine 408 generates an interrupt. In general, the interrupt criteria represent the number of pulses detected over an interval of time. There are multiple ways to count the number of pulses, e.g., the number of rising edges, the number of falling edges, the number of "pulses," etc. In theory the number of pulses should be the same as the rising and falling edges, but in certain operational modes the number of rising edges is allowed to be different from the number of falling edges. Moreover, different thresholds can be employed for the number of rising edges, falling edges, and pulses. In addition, multiple signals (e.g., 3) can be used to verify memory overflow. These signals can be of great value for timing design and debugging.

Figure 6:
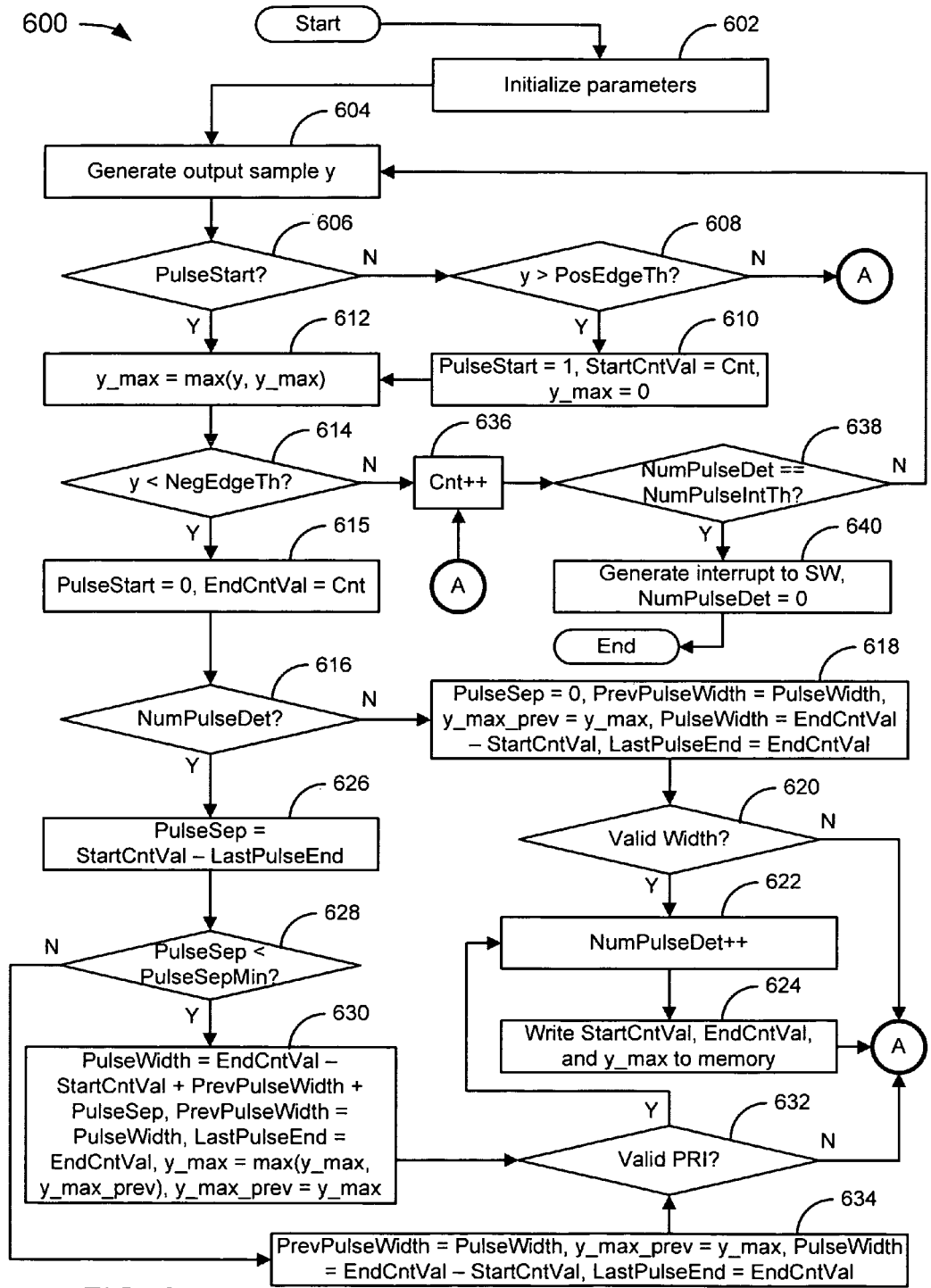
FIG. 6 depicts a flowchart of an example of a method for constellation matching facilitating pulse processing in hardware.

Advantageously, the components 404-408 can be implemented in relatively fast media (e.g., hardware). FIG. 6 depicts a flowchart 600 of an example of a method for constellation matching facilitating pulse processing in hardware. This method and other methods are depicted as serially arranged modules. However, modules of the methods may be reordered, or arranged for parallel execution as appropriate. This and other methods described in this paper can be implemented on machines such as those described by way of example with reference to FIGS. 1-5.

In the example of FIG. 6, the flowchart 600 starts at module 602 with setting parameters to an initial value of zero. The parameters that are initialized include those listed in Table 2: Initialized Parameters. Table 3: Other Parameters lists variables used in the flowchart 600 that are not initialized at module 602 (generally because initialization is unnecessary).

TABLE 2

Initialized Parameters

| Initialized Parameters | Notes |
|---|---|
| StartCntVal | Counter value at start of pulse |
| EndCntVal | Counter value at end of pulse |
| LastPulseEnd | Counter value at end of previous pulse |
| PulseStart | Set to 1 during pulse, set to 0 otherwise |
| y_max | Maximum energy filter sample of primary user pulse |
| y_max_prev | Maximum energy filter sample of previous primary user pulse |
| NumPulseDet | Number of pulses detected |
| PulseWidth | Width of pulse |
| PrevPulseWidth | Width of previous pulse |
| PulseSep | Separation of pulses |
| Cnt | Sample counter for primary user block |

TABLE 3

Other Parameters

| Other Parameters | Notes |
| --- | --- |
| y | Energy filter output for primary user |
| PulseSepMin | Minimum separation of unique pulses |
| NumPulseIntTh | Number of pulses before interrupting software |
| PosEdgeTh | Energy threshold for detecting start (positive edge) of primary user pulse |
| NegEdgeTh | Energy threshold for detecting end (negative edge) of primary user pulse |
| TOL_w | Tolerance for pulse width |
| TOL_pri | Tolerance for PRI |

In the example of FIG. 6, the flowchart 600 continues to module 604 with generating output sample y. The output sample can be generated in advance of carrying out the flowchart 600, and provided as the output from an energy filter. If the output sample y is not available at a given time, a method can halt or loop until an output sample y becomes available.

In the example of FIG. 6, the flowchart 600 continues to decision point 606 where it is determined whether PulseStart is true (i.e., non-zero). Conceptually, if a pulse has not been started, PulseStart is false and if a pulse has been started then PulseStart is true. If it is determined that a pulse has not been started (606—N), then the flowchart 600 continues to decision point 608 where it is determined whether y>PosEdgeTh. If it is determined that y>PosEdgeTh (608—N), then the flowchart 600 continues to module 636, which is described later. If, on the other hand, it is determined that y<=PosEdgeTh (608—Y), then the flowchart 600 continues to module 610 where PulseStart is set to 1, StartCntVal is set to Cnt, and y_max is set to 0. Conceptually, setting PulseStart to 1 (true) means that a pulse has started; setting StartCntVal to Cnt means that the starting count value is the current value of the counter (0 if the counter still has its initial value of 0); and setting y_max to 0 means that the maximum energy filter sample of the primary user pulse that has started is initialized to a starting value of 0.

If it is determined that a pulse has been started (606—Y) or following module 610 in any case, the flowchart 600 continues to module 612 where y_max is set to the higher of y or y_max. Conceptually, if y is greater than y_max, then it is desirable to set a new maximum for y. It may be noted that the manner in which this or any of the other formulae illustrated in the example of FIG. 6 is not critical. For example, instead of a formula that sets y_max to the higher of y or y_max, one could use an inequality to determine whether y is greater than y_max, and set y_max to y if y is determined to be greater.

In the example of FIG. 6, the flowchart 600 continues to decision point 614 where it is determined whether y<NegEdgeTh. If it is determined that y>=NegEdgeTh (614—N), then the flowchart 600 continues to module 636, which is described later. If, on the other hand, it is determined that y<NegEdgeTh (614—Y), then the flowchart 600 continues to module 615 where PulseStart is set to 0 and EndCntVal is set to Cnt in preparation for consideration of an initial signal or a unique signal, or merging pulses.

In the example of FIG. 6, the flowchart 600 continues to decision point 616 where it is determined whether NumPulseDet is true (i.e., non-zero). Conceptually, if NumPulseDet is false, then the pulse is an initial pulse.

If it is determined that NumPulseDet is false (616—N), then the flowchart 600 continues to module 618 where PulseStart and PulseSep are set to 0, EndCntVal is set to Cnt, PrevPulseWidth is set to PulseWidth, y_max_prev is set to y_max, PulseWidth is set to EndCntVal minus StartCntVal, and LastPulseEnd is set to EndCntVal. The order in which the parameters are set may or may not be important. For example, EndCntVal should be set to Cnt before PulseWidth is set to EndCntVal minus StartCntVal.

In the example of FIG. 6, the flowchart 600 continues to decision point 620 where it is determined whether the initial pulse has a valid width. The criteria for determining whether a pulse has a valid width is likely to vary depending upon the valid widths for a given primary user. For example, if the primary user is radar, a table such as is illustrated above (Table 1) can be consulted to determine whether minPulseWidth−TOL_w<=PulseWidth<=maxPulseWidth+TOL_w. minPulseWidth and maxPulseWidth are respectively the lowest and highest valid widths in the relevant table, while TOL_w is subtracted or added to the values to allow for pulse width tolerance, which can be set in a manner that is configuration- and/or implementation-specific and which depends upon an acceptable level of tolerance for a given system. If width of a pulse falls within the minimum and maximum pulse, adjusted by allowable tolerance, then the pulse width is valid (though it may or may not be known whether the pulse is valid based solely upon whether the width is valid). If it is determined that the initial pulse has a valid width (620—Y), then the flowchart 600 continues to module 622 where NumPulseDet is incremented and to module 624 where StartCntVal, EndCntVal, and y_max are written to memory. In this way, data associated with an initial pulse with a valid width is saved for later software processing (following a software interrupt).

If it is determined that an initial pulse does not have a valid width (620—N) or following module 624 in any case, the flowchart 600 continues to module 636, which is described later.

Returning once again to decision point 616, if it is determined that NumPulseDet is true (616—Y), then the flowchart 600 continues to module 626 where PulseSep is set to StartCntVal minus LastPulseEnd. Conceptually, when a pulse other than an initial pulse is considered, it can be advantageous to compare the separation between pulses for the purpose of determining whether a pulse is valid. To accomplish this, PulseSep should have a value indicative of the separation between the end of the last pulse (LastPulseEnd) and the start of the current pulse (StartCntVal).

In the example of FIG. 6, the flowchart 600 continues to decision point 628 where it is determined whether PulseSep<PulseSepMin. Conceptually, if the separation between pulses is less than the minimum separation for pulses associated with a relevant primary user, then it can be assumed that the pulses are either not associated with a primary user or have been measured incorrectly. To err on the side of caution, if the separation between pulses is less than the minimum separation for pulses associated with a relevant primary user, the pulses can be merged. Otherwise, the current pulse can be treated as a unique pulse.

If it is determined that PulseSep<PulseSepMin (628—Y), then the flowchart 600 continues to module 630 with setting PulseStart to 0, setting EndCntVal to Cnt, setting PulseWidth to EndCntVal−StartCntVal+PrevPulseWidth+PulseSep, setting PrevPulseWidth to PulseWidth, setting LastPulseEnd to EndCntVal, setting y_max to the maximum of y_max and y_max_prev, and setting y_max_prev to y_max.

In the example of FIG. 6, the flowchart 600 continues to decision point 632 where it is determined whether the pulse PRI is valid. The criteria for determining whether a pulse has a valid PRI is likely to vary depending upon the valid widths and separation between pulses for a given primary user. For example, if the primary user is radar, a table such as is illustrated above (Table 1) can be consulted to determine whether minPRI−TOL_pri<=PulseWidth+PulseSep<=maxPRI+ TOL_pri. If PRI of a pulse falls within the minimum and maximum pulse, adjusted by allowable tolerance, then the pulse PRI is valid (though it may or may not be known whether the pulse is valid based solely upon whether the PRI is valid). It is also likely to be desirable to determine whether width is valid, as described above with reference to decision point 620. It is also likely to be desirable to determine whether a detected pulse is identifiable as associated with other than a primary user (e.g., a secondary user) using a packet filter that has knowledge of one or more pulse parameters other than those associated with a primary user. For example, if a detected pulse is a WLAN packet, then the pulse can be determined to be invalid. It is also likely to be desirable to determine whether the transmitter is enabled. For example, if the transmitter is enabled, it is difficult to ensure that a pulse is invalid. Thus, for example, the determination at decision point 632 can entail determining that a detected pulse is not identifiable as other than the primary user, that the transmitter is not enabled, and the width and PRI of the pulse are within parameters of a relevant primary user. If it is determined that the initial pulse has a valid PRI (620—Y), then the flowchart 600 continues to module 622 as described previously. When writing to memory at module 624, data associated with merged pulses having valid PRI (and width) is saved for later software processing (following a software interrupt).

If, on the other hand, it is determined that Pulse Sep>=PulseSepMin (628—N), then the flowchart 600 continues to module 634 with setting PulseStart to 0, setting EndCntVal to Cnt, setting PrevPulseWidth to PulseWidth, setting y_max_prev to y_max, setting PulseWidth to End-CntVal−StartCntVal, and setting LastPulseEnd to End-CntVal. The flowchart 600 then continues to decision point 632 as described previously. If PRI is valid (632—Y), then when writing to memory at module 624, data associated with a unique pulse having a valid PRI (and width) is saved for later software processing (following a software interrupt).

As was indicated above, several modules (i.e., decision point 608, decision point 614, decision point 620, module 624, and decision point 632) continue to module 636. In the example of FIG. 6, at module 636, Cnt is incremented. A counter can be implemented in any convenient fashion and can be of a size that is appropriate for a given implementation. It is expected that an implemented counter will be capable of higher count than is necessary because the cost is relatively low (e.g., a 32 bit counter for implementations in which the primary user is radar). In general, counter size will be higher for systems that have higher frequencies. The counter can start at 0 or any other value and can "turn over" back to 0 when the maximum count is reached.

In the example of FIG. 6, the flowchart 600 continues to decision point 638 where it is determined whether NumPulseDet==NumPulseIntTh is true. Conceptually, pulses are considered until an interrupt threshold (e.g., number of pulses) is reached. Until the interrupt threshold is reached, the flowchart 600 considers more samples y. If it is determined that NumPulseDet==NumPulseIntTh is not true (638—N), then the flowchart 600 returns to module 604 and continues as described previously for a next sample y. If, on the other hand, it is determined that NumPulseDet==NumPulseIntTh is true (638—Y), then the flowchart 600 continues to module 640 where an interrupt is generated to software, NumPulseDet is reset to 0, and the flowchart 600 ends. (Presumably the flowchart would start again following the software interrupt, or could be executing concurrently for a different thread.)

Referring once again to the example of FIG. 4, the system 400 can determine whether a valid (e.g., radar) burst was received by ignoring WLAN packets and other spurious interference and by accounting for the possibility of staggered PRIs, i.e., more than one PRI in a burst. Since closely spaced pulses stored in the pulse datastore 406 most likely correspond to a single pulse that was distorted by the AGC, the filtering engine 404 first merges pulses whose separation is less than a specified threshold. Out of the Q<=K merged pulses, the filtering engine 404 removes the pulses that do not have a valid width for an applicable primary user and stores up to M pulses in the pulse datastore 406 for further processing.

In the example of FIG. 4, the constellation matching engine 410 is triggered by the interrupt from the interrupt generation engine 408. In an embodiment, the constellation matching engine 410 includes software implemented on hardware. Since the number of interrupts are limited, the frequency of interrupts to software can be limited. Once an interrupt is generated to software, the constellation matching engine 410 reads the pulse datastore 406 of pulse start and end times. The number of pulses stored in the pulse datastore 406 is denoted by K=NumPulseIntTh. Note that because of WLAN packets and other spurious pulses, several interrupts (each with K pulses) may need to be processed to store M pulses with valid widths. The constellation mapping engine 410 then checks whether a valid combination of pulse width, pulse repetition interval (PRI) and number of pulses is found to declare the presence or absence of a primary user.

Figure 7:
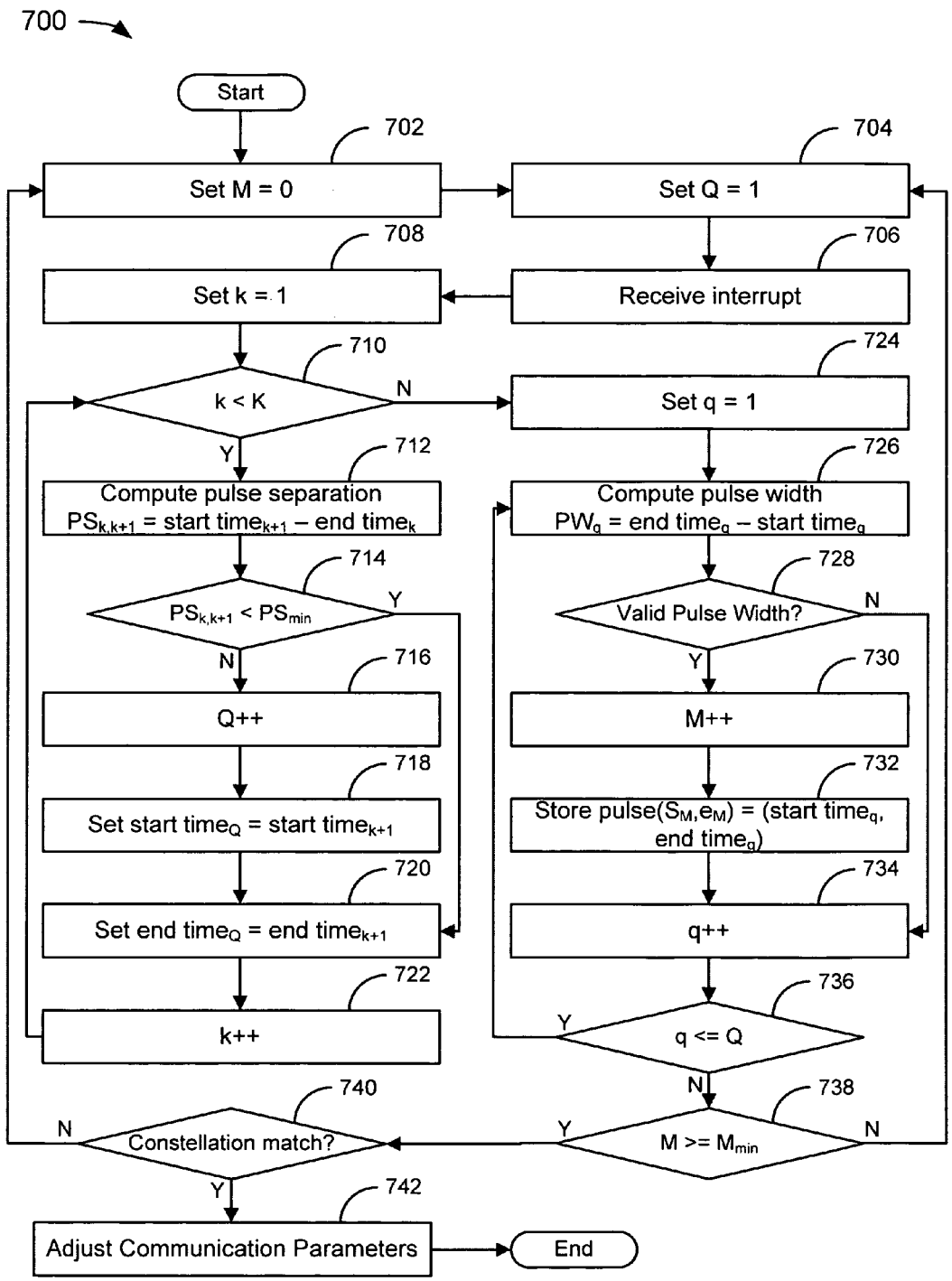
FIG. 7 depicts a flowchart of an example of a method for signal processing to facilitate constellation matching.

FIG. 7 depicts a flowchart 700 of an example of a method for signal processing to facilitate constellation matching. In the example of FIG. 7, the flowchart 700 starts at module 702 with setting M to 0 and continues to module 704 with setting Q to 1. These parameters have been described previously. Other parameters used in the example of FIG. 7 (and FIG. 8) are listed in the following table.

TABLE 4

| Parameters | Notes |
| --- | --- |
| $TOL\_w\_s$ | Software tolerance for pulse width |
| $TOL\_pri\_s$ | Software tolerance for PRI |
| K | Number of pulses captured for each interrupt |
| $PS_{min}$ | Minimum pulse separation (pulse merging criterion) |
| $M_{min}$ | Number of filtered pulses needed to perform constellation matching |
| $N_{min}, N_{max}$ | Minimum and maximum thresholds on number of pulses |
| $MAD_{w,max}$ | Threshold on median absolute deviation (MAD) of pulse width |
| $MAD_{p,max}$ | Threshold on MAD of PRI |

In the example of FIG. 7, the flowchart 700 continues to module 706 where an interrupt is received. A system implementing the method waits until an interrupt is received, though it is not critical what is meant by the term "pause." Any applicable known or convenient mechanism for enabling the system to perform signal processing upon receipt of an interrupt could be used.

In the example of FIG. 7, the flowchart 700 continues to module 708 with setting k=1. The parameter k is a loop counter for a (pre-test or "while") logical loop that includes the modules 708-722.

In the example of FIG. 7, the flowchart 700 continues to decision point 710 where it is determined whether k<K. This decision point is a condition associated with the logical loop that includes the modules 708-722. The condition will be true as long as the current value of k is less than K (the number of pulses captured for each interrupt). If it is determine that k<K (710—Y), then the flowchart 700 continues to module 712 with computing pulse separation $PS_{k,k+1}$=start time$_{k+1}$−end time$_k$. Conceptually, $PS_{k,k+1}$ represents (after the computation) the time interval between the end of the current pulse (k) and the start of the next pulse (k+1).

In the example of FIG. 7, the flowchart 700 continues to decision point 714 where it is determined whether $PS_{k,k+1}$>$PS_{min}$. Conceptually, if the pulse separation is less than a minimum pulse separation (which may vary depending upon implementation- and/or configuration-specific factors) then pulses can be merged. If it is determined that $PS_{k,k+1}$<$PS_{min}$ is false (714—N), then the flowchart 700 continues to module 716 with incrementing Q. Conceptually, this means that the pulses are sufficiently separated so no merging of pulses is called for. So Q is increased to indicate a unique pulse that is sufficiently separated from the previous pulse. The flowchart 700 then continues to module 718 with setting the start time of the unique pulse to the start time of the k+1 pulse. If, on the other hand, it is determined that $PS_{k,k+1}$<$PS_{min}$ is true (714—Y) or in any case following module 718, the flowchart 700 continues to module 720 with setting the end time of the pulse to the end time of the k+1 pulse. In this way, if pulses are not to be merged, then Q is incremented and a new start time is set prior to setting a new end time, but if pulses are to be merged then Q is not incremented and a previous start time is used instead (because module 718 is skipped).

In the example of FIG. 7, the flowchart 700 continues to module 722 where k is incremented. Then the flowchart 700 returns to decision point 710 where the loop condition is checked again. The loop is intended to have K−1 iterations. After the final iteration, the flowchart 700 continues to module 724 with setting q to 1. The parameter q is a loop counter for a (post-test or "do while") logical loop that includes the modules 724-736.

In the example of FIG. 7, the flowchart 700 continues to module 726 with computing pulse width $PW_q$=end time$_q$−start time$_q$. Conceptually, the pulse width is determined to be the difference between the start time and the end time.

In the example of FIG. 7, the flowchart 700 continues to decision point 728 with determining whether the pulse width is valid. The determination of whether a pulse width is valid is similar to the determination made in hardware (see, e.g., decision point 620, FIG. 6). Specifically: PWq is a valid pulse if there is an entry in the primary user table such that minPulseWidth−TOL_w_s<=$PW_q$<=maxPulseWidth+TOL_w_s. If the pulse width is valid (728—Y), then the flowchart 700 continues to module 730 with incrementing M. So M is increased to indicate another pulse having a valid width. Then the flowchart 700 continues to module 732 with storing start time and end time of the pulse.

In the example of FIG. 7, the flowchart 700 continues to module 734 where q is incremented. Then the flowchart 700 continues to decision point 736 here it is determined whether q<=Q. This decision point is a condition associated with the logical loop that includes the modules 724-736. The condition will be true as long as the current value of q is less than or equal to Q (the number of merged pulses). If it is determined that q<=Q is true (736—Y), then the flowchart 700 returns to module 726 and continues as described previously. If, on the other hand, it is determined that q<=Q is false (736—N), then the flowchart 700 continues to decision point 738 with determining whether M>=$M_{min}$ is true. Conceptually, until M reaches the minimum number of filtered pulses needed to perform constellation mapping, the flowchart 700 loops through a "preprocessing" stage that includes the modules 704-738. The minimum number of filtered pulses needed to perform constellation is implementation- and/or configuration-specific. If it is determined that M>=$M_{min}$ is false (738—N), then the flowchart 700 returns to module 704 and continues as described previously. If, on the other hand, it is determined that M>=$M_{min}$ is true (738—Y), then the flowchart 700 continues to decision point 740 where it is determined whether a constellation match is found.

Figure 8:
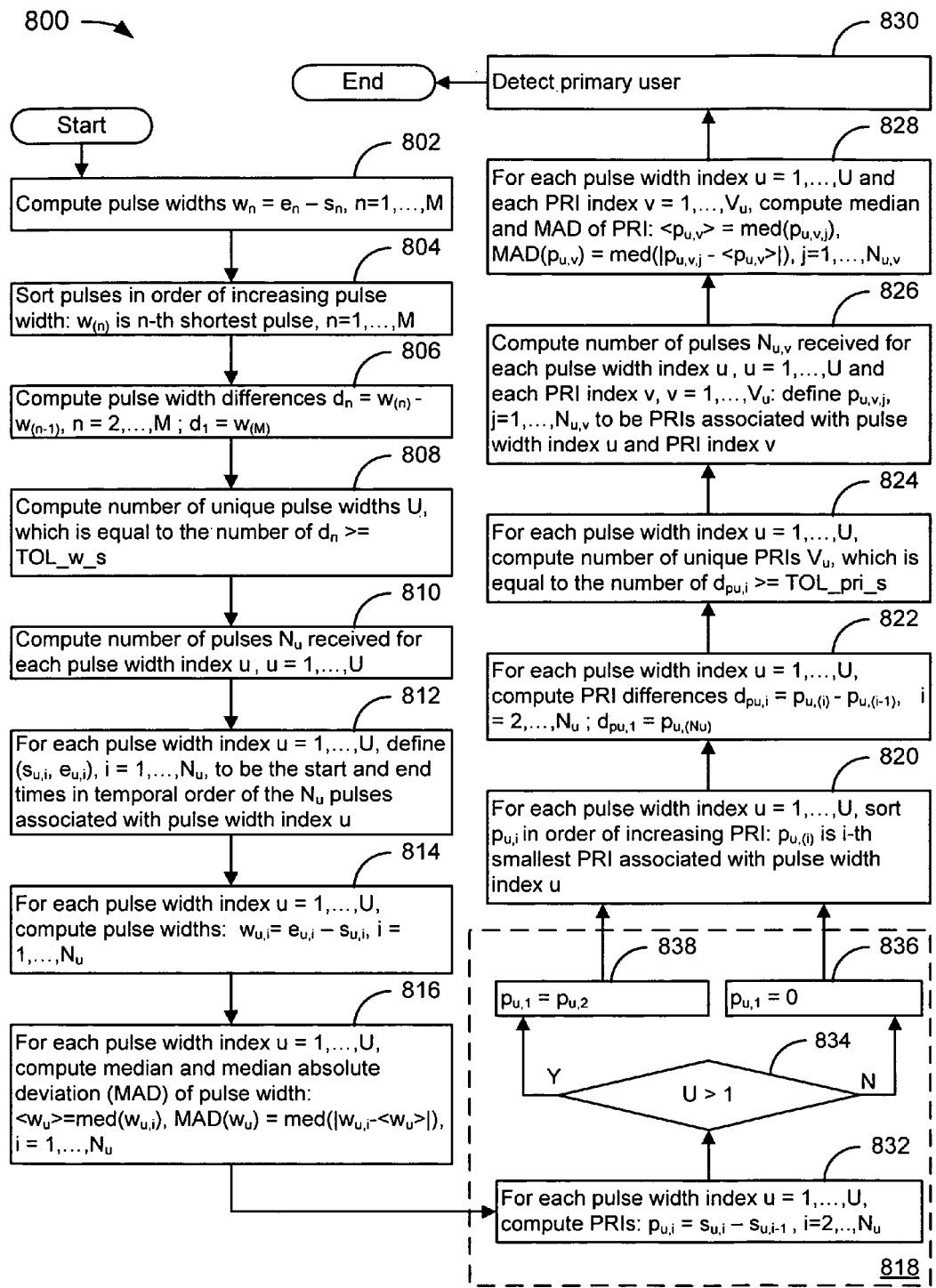
FIG. 8 depicts a flowchart of an example of a method for constellation matching to detect a primary user.

FIG. 8 depicts a flowchart 800 of an example of a method for constellation matching to detect a primary user. In the example of FIG. 8, the flowchart 800 starts at module 802 with computing pulse widths $w_n$=$e_n$−$s_n$, n=1, . . . M. Conceptually, each pulse width is equal to the difference between the start and end of the pulse.

In the example of FIG. 8, the flowchart 800 continues to module 804 with sorting pulses in order of increasing pulse width: $w_{(n)}$ is $n^{th}$ shortest pulse, n=1, . . . M. Conceptually, the M pulses are sorted into a list of pulses that is ordered by width.

In the example of FIG. 8, the flowchart 800 continues to module 806 with computing pulse width differences $d_n$=$w_{(n)}$−$w_{(n-1)}$, n=2, . . . M ; $d_1$=$w_{(M)}$. Conceptually, an array of width differences between each neighbor of the width-ordered list of pulses is computed.

In the example of FIG. 8, the flowchart 800 continues to module 808 with computing a number of unique pulse widths U, which is equal to the number of $d_n$>=TOL_w_s.

In the example of FIG. 8, the flowchart 800 continues to module 810 with computing a number of pulses $N_u$ received for each pulse width index u, u=1, . . . U. Conceptually, the M pulses are organized such that each pulse is associated with a width parameter. That is, for each $N_u$, there is, conceptually, a corresponding list of pulses. Since each of the M pulses is organized thus, the following is true:

$$\left[\sum_{u=1}^{U} N_u = M\right].$$

In the example of FIG. 8, the flowchart 800 continues to module 812 with, for each pulse width index u=1, . . . U, defining ($s_{u,i}$, $e_{u,i}$), i=1, . . . $N_u$, to be the start and end times in temporal order of the $N_u$ pulses associated with pulse width index u. Since the module 812 is definitional, it could be considered optional in an embodiment in which each pulse already has stored a start and end time (e.g., a timestamp). However, the definition is useful for illustrative purposes.

In the example of FIG. 8, the flowchart 800 continues to module 814 with, for each pulse width index u=1, . . . U, computing pulse widths: $w_{u,i}$=$e_{u,i}$−$s_{u,i}$, i=1, . . . $N_u$. It may be noted that pulse widths for each of the M pulses was computed at module 802. Accordingly, the module 814 could be considered optional or definitional, assuming the computation at module 802 can be stored. However, the definition is useful for illustrative purposes.

In the example of FIG. 8, the flowchart 800 continues to module 816 with for each pulse width index u=1, . . . U, computing median and median absolute deviation (MAD) of pulse width: $<w_u>$=med($w_{u,i}$), MAD($w_u$)=med($|w_{u,i}−<w_u>|$), i=1, . . . $N_u$. At this stage in the flowchart 800, the information needed to determine whether primary user widths are valid can be made. For example, if MAD($w_u$)<=$MAD_{w,max}$, a primary user could be detected, albeit with a potentially high probability of error compared to when other parameters are considered. Using width alone, while effective at reducing complexity, is not necessarily ideal for all implementations. Advantageously, a determination associated with PRI can also be made to improve precision, while maintaining relatively low complexity.

In the example of FIG. 8, the flowchart 800 continues to module 818 which includes a for loop: for each pulse width index u=1, ... U, .... The for loop of module 832 extends to each submodule of the module 818 (i.e., each submodule is in the for loop "for each pulse width index u=1, ... U"), which includes module 832, decision point 834, module 836, and module 838. At module 832, PRIs are computed: $p_{u,i}=s_{u,i}-s_{u,i-1}$, i=2, ..., $N_u$. At decision point 832, it is determined whether U>1. If U is not greater than one, then at module 834, $p_{u,1}=0$. If U is greater than one then at module 836, $p_{u,1}=p_{u,2}$.

In the example of FIG. 8, the flowchart 800 continues to module 820 with for each pulse width index u=1, ... U, sorting $p_{u,i}$ in order of increasing PRI: $p_{u,(i)}$ is $i^{th}$ smallest PRI associated with pulse width index u. This module is similar to module 804, but is associated with PRI instead of width.

In the example of FIG. 8, the flowchart 800 continues to module 822 with for each pulse width index u=1, ... U, computing PRI differences $d_{pu,i}=p_{u,(i)}-p_{u,(i-1)}$, i=2, ... $N_u$; $d_{pu,1}=p_{u,(Nu)}$. This module is similar to module 806, but is associated with PRI instead of width.

In the example of FIG. 8, the flowchart 800 continues to module 824 with for each pulse width index u=1, ... U, computing number of unique PRIs $V_u$, which is equal to the number of $d_{pu,i}>=$TOL_pri_s. This module is similar to module 808, but is associated with PRI instead of width.

In the example of FIG. 8, the flowchart 800 continues to module 826 with computing number of pulses $N_{u,v}$ received for each pulse width index u, u=1, ... U and each PRI index v, v=1, ... $V_u$: define $p_{u,v,j}$, j=1, ..., $N_{u,v}$ to be PRIs associated with pulse width index u and PRI index v.

In the example of FIG. 8, the flowchart 800 continues to module 828 with for each pulse width index u=1, ... U and each PRI index v=1, ... $V_u$, computing median and MAD of PRI: $<p_{u,v}>=$med($p_{u,v,j}$), MAD($p_{u,v}$)=med($|p_{u,v,j}-<p_{u,v}>|$), j=1, ..., $N_{u,v}$.

In the example of FIG. 8, the flowchart 800 ends at module 830 with detecting a primary user. For the purposes of this example, a primary user is detected if the following four conditions are met:

1. ($<w_u>$, $<p_{u,v}>$) valid,
2. MAD($w_u$)<=$MAD_{w,max}$,
3. MAD($p_{u,v}$)<=$MAD_{p,max}$, and
4. $N_{min}<=N_{u,v}<=N_{max}$ for at least 1 (u,v), u=1, ... U; v=1, ... $V_u$. ($N_{min}$ and $N_{max}$ may be functions of ($<w_u>$, $<p_{u,v}>$), according to a table of primary user, e.g., radar, types. ($<w_u>$, $<p_{u,v}>$) is a valid pair if there is an entry in the table such that minPulseWidth−TOL_w_s<=$<w_u>$<=maxPulseWidth+TOL_w_s and minPRI−TOL_pri_s<=$<p_{u,v}>$<=maxPRI+TOL_pri_s.)

If these conditions are met, then a constellation match has been found. It may be noted that error is possible. Reduced complexity, as is introduced by the techniques described in this paper, results in less precision. However, precision can be adjusted so as to meet the operational requirements of a given implementation. Advantageously, this technique enables use of a PRI and width constellation to identify signals within a certain radius (or, more generally, distance) from mean to identify signals in association with a primary user.

Figure 9:
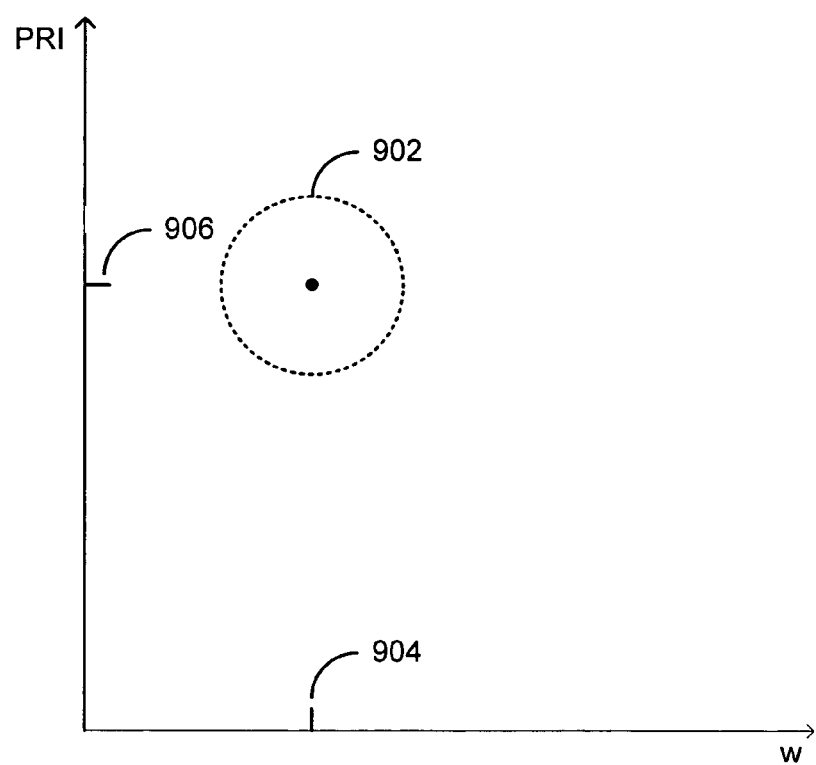
FIG. 9 illustrates a conceptualization of the constellation matching on a PRI-width graph.

FIG. 9 illustrates a conceptualization of the constellation matching on a PRI-width graph 900. The graph 900 includes an area 902 in which pulses can be plotted. Conceptually, if there are a large number of plots in the area 902, the constellation is a match, and if there are a small number of plots in the area 902, the constellation is not a match. Whether a number of plots is small or large can be adjusted in accordance with implementation- and configuration-specific factors. Where a distance $P_i$, $P_j$ is less than or equal to the radius of the area 902, a plotted location can be referred to as a neighbor. When the number of neighbors reaches a detection threshold, a primary user is detected. For illustrative purposes, the mean point is plotted at width axis location 904 and PRI axis location 906. The area 902 need not actually be a circle; some other shape could be used where the results of a different shape are adequate for a particular implementation and acceptable operational parameters.

Referring once again to the example of FIG. 7, if it is determined that a constellation match is not found (740—N), then the flowchart 700 returns to module 702 and continues as described previously. If, on the other hand, it is determined that a constellation match is found (740—Y), then the flowchart 700 ends at module 742 with adjusting communication parameters. Adjusting communication parameters can include DFS, TPC, or some other technique to make way for a detected primary user.

Figure 10:
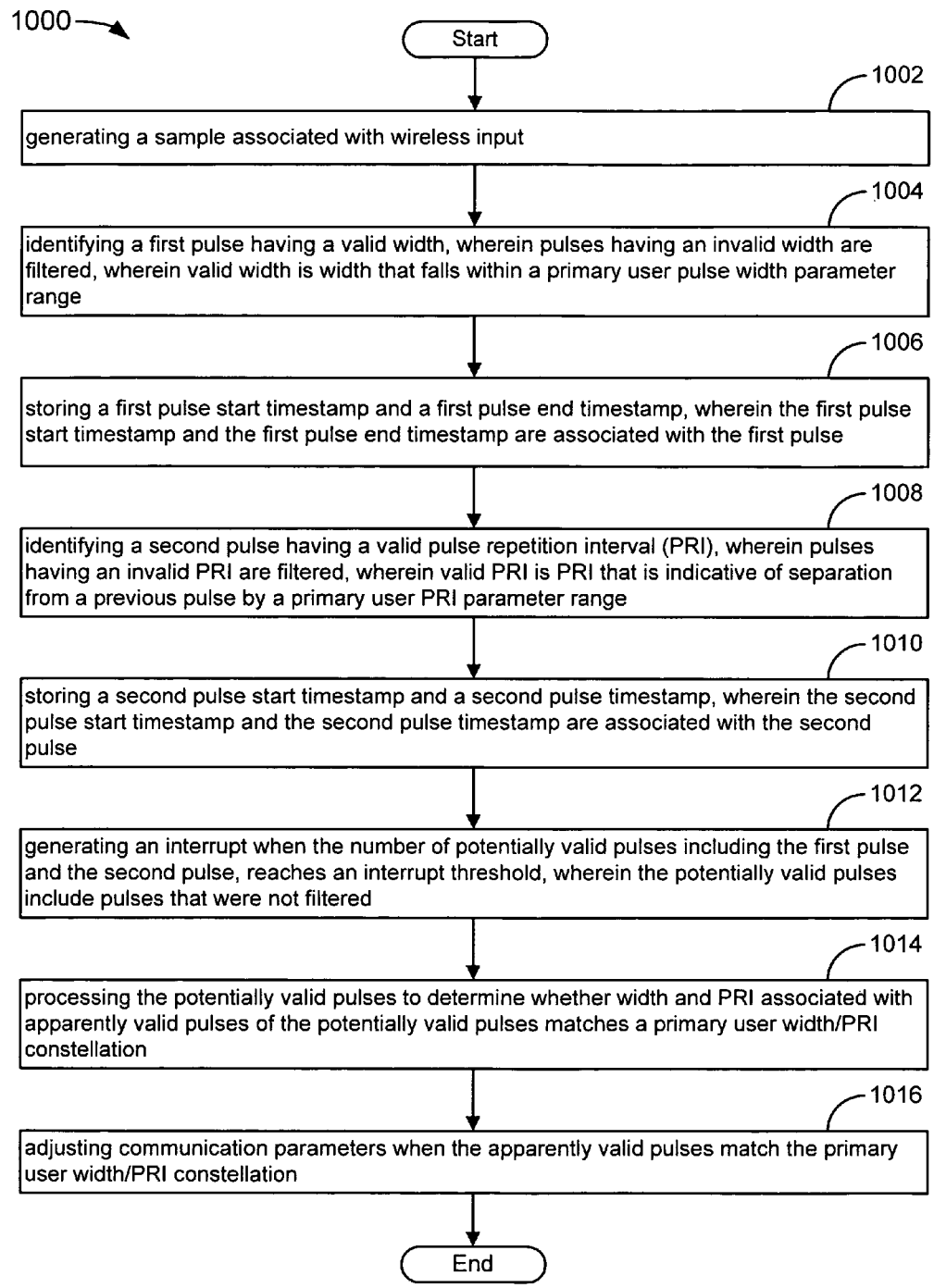
FIG. 10 depicts a flowchart of an example of a method for wireless pulse constellation matching.

FIG. 10 depicts a flowchart 1000 of an example of a method for wireless pulse constellation matching. In the example of FIG. 10, the flowchart 1000 starts at module 1002 with generating a sample associated with wireless input. The sample can include a digital signal that is converted from analog to digital in a known or convenient manner.

In the example of FIG. 10, the flowchart 1000 continues to module 1004 with identifying a first pulse having a valid width, wherein pulses having an invalid width are filtered, wherein valid width is width that falls within a primary user pulse width parameter range. A first pulse can be identified in hardware, without using software, which is generally known to be slower but more versatile than processes that are implemented in hardware or firmware. A pulse that is processed from a sample may or may not be potentially valid. For this reason, a first potentially valid pulse may or many not be the first pulse that is processed. Of course, assuming that at least one pulse in a sample is potentially valid, there will be an "initial potentially valid pulse" for any given sample. If the first pulse is an initial potentially valid pulse, the first pulse has, for example, a valid width (e.g, a width that falls within primary user pulse width parameters, plus or minus error). It may not be possible to perform certain other validity checks that might be applicable to pulses in the sample that are processed later. For example, PRI validity can require considering separation between the first pulse and a pulse that was previously received. For illustrative purposes, the first pulse is treated as the initial potentially valid pulse, since later-received pulses can be described later in association with the flowchart 1000.

In the example of FIG. 10, the flowchart 1000 continues to module 1006 with storing a first pulse start timestamp and a first pulse end timestamp, wherein the first pulse start timestamp and the first pulse end timestamp are associated with the first pulse. Since it is assumed for illustrative simplicity that the first pulse is an initial potentially valid pulse, PRI-related data is not stored in association with the first pulse (or, e.g., a default value is used). A timestamp is intended to include any applicable data structure or value that enables one to distinguish between temporally distinguishable data points, such as rising edges, falling edges, etc., over a range and with sufficient definition to meet the needs or preferences of a given application. Other data can also be stored in association with the first pulse, such as signal energy.

In the example of FIG. 10, the flowchart 1000 continues to module 1008 with identifying a second pulse having a valid pulse repetition interval (PRI), wherein pulses having an invalid PRI are filtered, wherein valid PRI is PRI that is indicative of separation from a previous pulse by a primary user PRI parameter range. It is assumed for illustrative simplicity that the second pulse is after the first pulse; so the second pulse is not an initial potentially valid pulse. Thanks to this assumption, a pulse (either the first pulse or some other intervening pulse) will precede the second pulse. This fact enables a system to take advantage of another parameter, PRI. By considering the separation between the second pulse and a preceding pulse, it is possible to determine whether the second pulse has a valid PRI. If the second pulse has a PRI that falls within primary user PRI parameters, the second pulse can be identified as a potentially valid pulse. If the second pulse's PRI is lower than primary user pulse separation parameter, then the second pulse can be merged with the preceding pulse to produce a merged pulse, and then the merged pulse can be analyzed to determine whether it falls within the primary user PRI parameters.

In the example of FIG. 10, the flowchart 1000 continues to module 1010 with storing a second pulse start timestamp and a second pulse timestamp, wherein the second pulse start timestamp and the second pulse timestamp are associated with the second pulse. A system may or may not store PRI data, and can store other data as well. The system can either maintain a counter that indicates how many pulses have been stored, or be able to make the determination in some other manner.

In the example of FIG. 10, the flowchart 1000 continues to module 1012 with generating an interrupt when the number of potentially valid pulses including the first pulse and the second pulse, reaches an interrupt threshold, wherein the potentially valid pulses include pulses that were not filtered. The number of potentially valid pulses that are collected before reaching the interrupt threshold is implementation- and/or configuration-specific. It would likely be desirable to limit the number of interrupts as much as possible without causing the system to lose sufficient sensitivity for a given application. Advantageously, preprocessing the signals to filter invalid pulses can enable the system to operate more efficiently.

In the example of FIG. 10, the flowchart 1000 continues to module 1014 with processing the potentially valid pulses to determine whether width and PRI associated with apparently valid pulses of the potentially valid pulses matches a primary user width/PRI constellation. The processing of potentially valid pulses can occur in software. An engine that uses the software can potentially filter additional pulses even prior to considering whether pulses match a primary user width/PRI constellation. If so, apparently invalid pulses are filtered from the potentially valid pulses, leaving only apparently valid pulses for matching against the primary user width/PRI constellation.

In the example of FIG. 10, the flowchart 1000 ends at module 1016 with adjusting communication parameters when the apparently valid pulses match the primary user width/PRI constellation. Adjusting communication parameters can cause a radio to switch to a different frequency (e.g., using DFS) or to a different power (e.g., using TPC) or both (e.g., by switching to a safe channel that has lower associated power). It may be possible to adjust communication parameters other than frequency or power, though this would likely be the case only in unusual circumstances. Nevertheless, one of skill in the relevant art with this paper before them would understand that adjusting communication parameters may mean any applicable adjustment that enables a radio to more effectively operate within given parameters.

Systems described herein may be implemented on any of many possible hardware, firmware, and software systems. Algorithms described herein are implemented in hardware, firmware, and/or software that is implemented in hardware. The specific implementation is not critical to an understanding of the techniques described herein and the claimed subject matter.

As used in this paper, the term "embodiment" means an embodiment that serves to illustrate by way of example but not necessarily by limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system comprising:
an information gathering engine;
a filtering engine coupled to the information gathering engine;
a constellation matching engine coupled to the information gathering engine;
wherein, in operation,
the information gathering engine receives wireless input and obtains information from the wireless input that facilitates low complexity identification of primary user signals;
the filtering engine uses the information to eliminate some pulses from further processing to identify primary user signals, leaving filtered pulses for further processing;
the constellation matching engine processes filtered pulses by mapping width and pulse repetition interval (PRI) associated with the filtered pulses to a constellation, wherein when the width and PRI are within constellation parameters attributable to primary user signals, a communication parameter adjustment control signal is sent to a radio frequency (RF) controller to change the communication parameters of a radio associated with the RF controller.

2. The system of claim 1, further comprising: an interrupt generation engine coupled to the filtering engine and the constellation mapping engine, wherein, in operation, when a number of filtered pulses reaches a filtered pulse number threshold, the interrupt generation engine generates an interrupt to trigger the constellation matching engine to process the filtered pulses.

3. The system of claim 1, wherein the information gathering engine can detect pulses.

4. The system of claim 1, wherein the information gathering engine is frequency variation sensitive.

5. The system of claim 1, wherein the filtering engine includes an energy filter.

6. The system of claim 5, wherein the energy filter includes a CIC filter.

7. The system of claim 1, wherein the filtering engine includes a duration filter.

8. The system of claim 1, wherein the filtering engine includes a packet filter.

9. The system of claim 1, further comprising a pulse datastore coupled to the filtering engine, wherein, in operation, the filtering engine stores filtered pulses in the pulse datastore for use by the constellation matching engine.

10. The system of claim 1, further comprising:
an antenna;
an RF chain coupled to the antenna;
an A/D converter coupled to the RF chain and the information gathering engine;
a signal processing subsystem coupled to the A/D converter;
wherein, in operation:
the antenna receives wireless input;
the RF chain downconverts the wireless input;
the A/D converter converts the downconverted wireless input to wireless digital input;
the information gathering obtains information from the wireless digital input;
the signal processing subsystem processes at least some of the wireless digital input to obtain data bits.

11. The system of claim 1, further comprising a candidate channel identification engine, wherein, in operation, the candidate channel identification engine identifies a channel to which the radio can switch in accordance with the communication parameter control signal.

12. The system of claim 1, wherein the radio is capable of dynamic frequency selection (DFS), and wherein, in operation, the communication parameter control signal is associated with DFS.

13. The system of claim 1, wherein the radio is capable of transmit power control (TPC), and wherein, in operation, the communication parameter control signal is associated with TPC.

14. The system of claim 1, wherein the primary user signals include radar signals.

* * * * *